UNITED STATES PATENT OFFICE 2,623,036

ACRYLATE-MALEATE COPOLYMERS

Harry T. Neher, Bristol, and William L. Van Horne and La Verne N. Bauer, Philadelphia, Pa., assignors to Rohm & Haas Company, Philadelphia, Pa., a corporation of Delaware No Drawing. Application January 17, 1950, Serial No. 139,131

3 Claims. (Cl. 260—78.5)

This invention relates to copolymers of an ester (A) of acrylic acid and a saturated monohydric aliphatic alcohol of 14 to 18 carbon atoms and an ester (B) of a saturated monohydric aliphatic alcohol of 4 to 14 carbon atoms and a maleic-type acid. It also relates to compositions of matter comprising wax-containing hydrocarbon liquids having dissolved therein a said copolymer in an amount to depress the pour point of the hydrocarbon fluid. The invention is particularly directed to lubricating oils having waxy-pour points to which has been added a said copolymer.

Polymeric products have been added to oils to increase their viscosity, to improve the temperature-viscosity relationship, to depress the pour point, and to effect other changes. It should be noted, however, that solution of a resinous or polymeric material in an oil does not ensure depression of the pour point. In many cases the pour point remains substantially unchanged. In some it is raised. In yet other instances it is lowered. These various effects have not been predictable. Indeed, there does not appear to be any way to foretell what polymeric materials will have value in oils, particularly with respect to depressing the pour point thereof.

We have observed that pure alkyl polyacrylates, even though oil-soluble, exert little if any depressing effect on the pour point of oils. Thus polymers of octadecyl acrylate, cetyl acrylate, and octyl acrylate have been found not to lower the pour points of typical wax-containing lubricating oils. We have likewise found that polymers of dihexyl fumarate, dioctyl maleate, dioctyl citraconate, didecyl maleate, dicetyl maleate, didodecyl chloromaleate, and dioctadecyl maleate do not lower the pour points of typical oils having waxy pour points.

It was, therefore, not to be anticipated that copolymers from octadecyl or cetyl acrylates or the like and dibutyl maleate, dihexyl maleate, dioctyl maleate, dioctyl fumarate, or the like would be found which have a powerful pour-depressing action. It was found that significant pour-depressing action is provided by copolymers of acrylic esters from alcohols, ROH, in which R is an alkyl group having a carbon chain of 14 to 18 carbon atoms and of maleinoid esters from an alcohol, R'OH, in which R' is an alkyl group of 4 to 14 carbon atoms, and a maleic-type acid, $HOOCC(X)=CHCOOH$, in which X is hydrogen, chlorine, or the methyl group, provided the ratio of acrylic ester units to maleinoid ester units falls within certain ratios. We have found that pour depressing action is obtained when the ratio of the acrylic ester units to maleinoid ester units varies from 1:0.25 to 1:$n$, where $n$ is a number equal to one half the number of carbon atoms in the longest straight chain of the group R' of the maleinoid ester. In case the two alkyl groups of the maleinoid ester are not identical $n$ is one half of the average number of carbon atoms in the chain of the alkyl groups.

Copolymers suitable for the purposes of this invention are prepared by mixing one mole of an acrylic ester, such as octadecyl acrylate, heptadecyl acrylate, cetyl acrylate, or myristyl acrylate, with at least 0.25 mole of a maleinoid ester, such as dibutyl maleate, dihexyl fumarate, di-2-ethylhexyl chloromaleate, dioctyl citraconate, didodecyl maleate, or myristyl maleate, and causing copolymerization to take place. The maximum effective amount of maleinoid ester which can be used is defined by the ratio of 1:$n$, as stated above. This ratio depends on the number of carbon atoms in the alcohol portion of the maleinoid ester. Thus, when a di-n-butyl ester is taken, not more than two moles should be copolymerized with one mole of acrylic ester. When a didodecyl maleate is used, there may be combined with one mole of acrylate as many as six moles of the maleate. When the alkyl group of the maleinoid ester is branched, there can be taken as a maximum per mole of acrylic ester to give a pour-depressing copolymer only as many moles of maleinoid ester as half the number of carbon atoms in the longest chain of the branched alkyl group.

Maleinoid esters which are useful in the proper proportion are defined by the formula

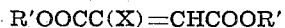

$$R'OOCC(X)=CHCOOR'$$

wherein X is hydrogen, chlorine, or the methyl group. These esters include those from maleic acid, fumaric acid, chloromaleic acid, citraconic acid, and mesaconic acid. The group R' is an alkyl group of 4 to 14 carbon atoms. It may be straight or branched. Typical alkyl groups include butyl, isobutyl, sec.-butyl, amyl, isoamyl, sec.-amyl, tert.-amyl, hexyl, 2-ethylbutyl, heptyl, 5-methylheptyl, octyl, capryl, 2-ethylhexyl, nonyl, 3,5,5-trimethylhexyl, decyl, dodecyl, and tetradecyl.

The maleinoid ester may be a mixed ester having two different alkyl groups as R'. There may be reacted with maleic, chloromaleic, fumaric, citraconic, or mesaconic acids, or their anhydrides where they exist, an equivalent proportion of one alcohol and then an equivalent of another.

Similarly, an acid may be reacted with a mixture of alcohols to give mixed maleic esters. With mixed alkyl groups present in these esters the maximum proportion of maleinoid ester that is copolymerized depends on the average chain length of the two alkyl groups.

Copolymerization of acrylic ester and maleinoid ester is effected under conditions that ensure copolymerization and not separate polymerization and that provide soluble copolymers. The mixture of the two types of esters is extended with or made in a mutual solvent, such as benzene, toluene, xylene, a petroleum naphtha, or similar volatile, inert, organic solvent. A catalyst is added in an amount sufficient to induce copolymerization. Amounts of catalyst from 2.5% to 15% of the weight of the mixed monomers may be used. In a preferred method the concentration of catalyst may be 2.5% to 5% of the weight of monomer at the start and catalyst is added as copolymerization proceeds. Solvent may also be added from time to time to ensure that the copolymer remains in solution.

As catalysts for copolymerization there are used organic peroxides or acyclic azo compounds, such as azodiisobutyronitrile. Suitable peroxides are acetyl peroxide, caproyl peroxide, lauroyl peroxide, benzoyl peroxide, dibenzal peroxide, di-tert.-butyl diperphthalate, tert.-butyl perbenzoate, 2,2-bis(tert.-butylperoxy)-butane, methyl ethyl ketone peroxide, di-tert.-butyl peroxide, tert.-butylhydroperoxide, etc.

One or more of the catalysts are added to the solution of monomers and the mixture heated to 75° C. to 150° C. One temperature range may be used at the start and another as copolymerization proceeds. Optimum temperatures depend on solvent selected, concentration of monomers therein, concentration of catalyst, copolymerization schedule, and time. The variables are selected with regard to the intended type of copolymer and its molecular size. Soluble copolymers are thus obtainable with molecular sizes from about 1000 to 20,000 or more. With the relatively higher proportions of acrylic ester to maleinoid ester high molecular weights can be attained without particular difficulty. Such copolymers not only have a pour point depressing action but improve the viscosity-temperature relationships. They may also increase the viscosity of oils in which they are dissolved.

Additional details in regard to preparing copolymers of this invention will be found in the following illustrative examples.

*Example 1*

There were mixed 395 parts by weight of cetyl acrylate, 605 parts by weight of didodecyl fumarate, the dodecyl groups of which contained branched chains as derived from a mixture of olefines, 500 parts of toluene, and 50 parts of benzoyl peroxide. The mixture was slowly added to a stirred reaction vessel heated by an external bath maintained at 110°–120° C. One hour after the charge had been placed in the reaction vessel, 20 parts of benzoyl peroxide was added. Heating was continued at 120°–124° C. for 2.5 hours, at which time the bath temperature was lowered to 100° C. and kept at about this level for the rest of the copolymerization time. At intervals of one hour additions of benzoyl peroxide of 50, 20, and 8 parts, respectively, were made. An hour after the last addition heating was discontinued and 50 parts of toluene was added. Analysis showed the presence of 44.5% of polymeric material in the resulting solution. A sample of this solution was reduced with toluene to a 30% copolymer content. This solution had a viscosity of 4.0 centistokes at 100° F.

The copolymer in toluene was transferred to a light lubricating oil by taking up 119 parts of the original toluene solution and 96 parts of the 30% toluene solution in 127 parts of oil. The mixture was stirred and heated under reduced pressure to a temperature of 140° C. at 1 mm. pressure. The resulting solution contained 34.7% of copolymer in oil.

*Example 2*

A mixture of 100 parts of stearyl acrylate, 400 parts of di-n-octyl fumarate, 100 parts of toluene, and 25 parts of benzoyl peroxide was added during the course of 1.8 hours to a reaction vessel heated to 120° C. The mixture was protected with nitrogen gas. After three hours 10 parts of benzoyl peroxide was added with the temperature at 118° C. After 4.5 hours the temperature was allowed to drop to 105° C. and at 4.75 hours 25 parts of benzoyl peroxide was added. After 5.75 hours with the temperature still at 105° C. 10 parts of the peroxide and 30 parts of toluene were added. After 6.2 hours 30 parts of toluene and at 6.75 hours 4 parts of benzoyl peroxide were added. At 7.75 hours 744 parts of toluene was added and heating was discontinued at 8 hours. The resulting solution contained 34.6% of copolymer. A 30% solution in toluene was found to have a viscosity of 33.2 centistokes at 100° F.

A portion of this solution was mixed with a light lubricating oil and the mixture heated up to 140° C. at 1 mm. A 37.2% solution of polymer in oil was thus prepared. It was found useful as an additive to lubricating oils to depress the pour point thereof.

*Example 3*

A mixture of 255 parts of octadecyl acrylate, 745 parts of didodecyl monochloromaleate, 500 parts of toluene and 84 parts of lauroyl peroxide was heated with stirring under a nitrogen atmosphere at 105°–112° C. Additions of catalyst were made as follows: at 4 hours, 33 parts; at 5 hours, 84 parts; at 6 hours, 33 parts; and at 7 hours, 13 parts. After 8 hours 40 parts of toluene was added and heating was discontinued. The product was a 51.5% solution of copolymer. A sample reduced with toluene to a 30% copolymer content had a viscosity of 1.9 centistokes at 100° F. This copolymer was found to give exceptionally low pour points in waxy oils.

*Example 4*

A mixture of 688 parts of octadecyl acrylate, 1312 parts of didodecyl citraconate, and 100 parts of benzoyl peroxide was slowly charged to a reaction vessel at 120° C. Additions of catalyst and solvent were made according to the following schedule: at 3.5 hours, 40 parts of catalyst (118° C.); at 5.25 hours, 100 parts of catalyst in 2300 parts of toluene (100° C.); at 6.25 hours, 40 parts of catalyst in 100 parts of toluene (100° C.); at 7.25 hours, 16 parts of peroxide in 300 parts of toluene (102° C.); and at 7.75 hours 2000 parts of toluene (104° C.). Heating was continued after 8 hours. A solution containing 29% of copolymer was obtained.

*Example 5*

A mixture of 70 parts of octadecyl acrylate, 130 parts of didodecyl maleate, and 10 parts of benzoyl peroxide was slowly added to a reaction vessel at 110°–120° C. flushed with nitrogen. The batch soon became very viscous and 155 parts of toluene were added before two hours had elapsed. At 2.8 hours a solution of 4 parts of the peroxide in 28 parts of toluene was added. The temperature was still maintained at 110°–120° C. At 4.5 hours 10 parts of peroxide and 70 parts of toluene were added and the temperature was allowed to drop. At 5.5 hours the temperature was 85° C. At that time a solution of 2 parts of the peroxide in 25 parts of toluene was added and more heat was supplied. At 6.7 hours the temperature was 102° C. and a solution of one part of the catalyst in 20 parts of toluene was added. The temperature thereafter was held at 105° C. until 7.75 hours, when heating was discontinued. The product was a 44.8% solution of copolymer. A 30% solution of this copolymer in toluene had a viscosity of 124.9 centistokes at 100° F.

The toluene solution was mixed with a light oil of low (+25° F.) pour point and the mixture heated to 140° F./1 mm. to strip off volatile material and yield a solution of 40% copolymer in oil. This oil solution had a viscosity of 289 centistokes at 210° F. and of 2003 centistokes at 100° F. It was suitable for addition to wax-containing petroleum fluids to reduce the pour points thereof.

Example 6

A mixture was prepared from 624 parts of octadecyl acrylate, 1376 parts of di-3,5,5-trimethylhexyl maleate, 1000 parts of toluene, and 100 parts of benzoyl peroxide. It was added during the course of 1.8 hours to a reaction vessel maintained between 125° and 110° C. by means of an oil bath. The vessel was flushed with nitrogen gas. At the end of the 3, 4, and 5 hour periods there were added 40, 100, and 16 parts respectively of benzoyl peroxide. At 7.75 hours 2000 parts of toluene was added and at 8 hours heating was discontinued. The product was a 35.1% solution of copolymer. A sample cut back to 30% of copolymer with toluene had a viscosity of 2.9 centistokes at 100° F.

Example 7

A reaction vessel was flushed with nitrogen and heated to about 120° C. by means of an oil bath. Thereto was added over a period of 1.6 hours a mixture of 45 parts of cetyl acrylate, 155 parts of di-n-octyl fumarate, 45 parts of toluene and 2.8 parts of azodiisobutyronitrile. Additions of catalyst and solvent were made at intervals with the temperature of the reaction mixture at indicated levels: at 3 hours, 1.1 parts of catalyst in 20 parts of toluene (120° C.); at 4.6 hours, 2.8 parts of catalyst and 20 parts of toluene (106° C., the temperature having been gradually reduced from 4 hours forward); at 5.6 hours, 1.1 parts of catalyst and 20 parts of toluene (106° C.); at 6.6 hours 0.4 parts of catalyst and 10 parts of toluene (106° C.). At 7.3 hours the batch was diluted with 94 parts of toluene and heating was discontinued. The product was a 45.3% solution of copolymer. A 30% solution of this copolymer in toluene had a viscosity of 2.5 centistokes at 100° F.

By the same procedure the same monomers in the same weights were copolymerized with substitution of the above catalyst with equal weights of tert.-butyl perbenzoate, lauroyl peroxide, and benzoyl peroxide. A solution of copolymer was obtained in each case. The 30% solutions of copolymers in toluene has the following viscosities, at 100° F., 2.6 centistokes, 2.3 centistokes, and 3.3 centistokes, respectively.

All of these copolymers were found soluble in petroleum oils and had marked influence on the properties thereof.

Example 8

A mixture of 247 parts of stearyl acrylate, for which the stearyl alcohol used was a fraction containing alcohols of 12, 14, and 16 carbon atoms to the extent of 15%, 753 parts of dimyristyl maleate, 250 parts of toluene, and 42 parts of lauroyl peroxide was heated at 125° C. at the start, then at 110° C., and later at 102°–105° C. for 7.75 hours. As in previous examples, additions of peroxide and solvent were made from time to time until a total of 125 parts of lauroyl peroxide and 1000 parts of toluene was used. The product was a 47% solution of copolymer in toluene. A 30% solution in toluene had a viscosity of 2.2 centistokes at 100° F.

Example 9

The above procedure was followed with 49.4 parts of stearyl acrylate, 150.6 parts of di-2-ethylhexyl maleate, 300 parts of toluene, and 25.6 parts of tert.-butyl perbenzoate, the latter two being used in increments as above. Heating was started at 125° C. and reduced to 100° C. The product was a 28.6% solution of copolymer in toluene having a viscosity of 2.1 centistokes at 100° F.

Example 10

A mixture of 16.5 parts of myristyl acrylate, 94 parts of didodecyl fumarate in which the dodecyl groups were branched as obtained from olefines by the "oxo" process, 140 parts of an aromatic, close-cut naphtha, and 14.8 parts of benzoyl peroxide was heated at 121° C.–100° C. as in previous examples. Copolymerization took place and there was obtained a 34.5% solution of copolymer in a yield of 93.5%. A 30% solution in toluene gave a viscosity of 2.8 centistokes at 100° F.

Example 11

Copolymerization was effected with 70 parts of myristyl acrylate, 29.7 parts of didodecyl maleate in which the dodecyl groups were obtained from a branched chain $C_{12}$ alcohol of 99% purity, 250 parts of toluene, and 100 parts of benzoyl peroxide by the procedures detailed above. Temperatures were varied from 125° C. at the start to 108° C. to 100° C. over the course of 7.5 hours with the usual additions of toluene and peroxide. The product was a 26.4% solution of copolymer. At 30% of copolymer the viscosity of the solution was 68.7 centistokes at 100° F.

Example 12

Copolymerization was effected with 147.8 parts of cetyl acrylate, 32.2 parts of dibutyl fumarate, 310 parts of toluene, and 29.6 parts of benzoyl peroxide as in previous experiments during a 7.75 hour period at temperatures of 122° C. to 100° C. There was thus prepared a solution of 35% of copolymer in toluene. A 30% solution of this copolymer in toluene had a viscosity of 12.7 centistokes at 100° F.

The same procedure was followed with 79 parts of cetyl acrylate, and 121 parts of dibutyl fumarate. There was obtained a 47.3% solution of copolymer in toluene. A 30% solution in toluene had a viscosity of 7.75 centistokes at 100° F.

Both of these copolymers depressed the pour points of typical wax-containing lubricating oils.

*Example 13*

The following materials were subjected to copolymerization in an atmosphere of nitrogen by heating at 120° C.: 9 parts of n-octadecyl thioacrylate, 16.8 parts of didodecyl maleate, 10 parts of toluene, and 1.25 parts of benzoyl peroxide. After three hours heating, additional benzoyl peroxide was added at 1¾ to 1 hour intervals amounting to 0.5, 1.25, 0.5 and 0.2 parts, respectively. After 8 hours the batch was diluted with 50 cc. of toluene.

Seventy-nine parts of product was obtained which contained 30.1% nonvolatile matter, representing a copolymer yield of 94.9%, based on the weight of the monomer used.

When 63 parts of the toluene solution (30.1% copolymer) was stripped in 28.4 parts of light lubricating oil under usual conditions, 51 parts of oil solution of copolymer was obtained. Calculations showed this concentrate to be 37.1% copolymer. This copolymer was found to be very effective as a pour point depressant.

The effect on the pour point of wax-containing hydrocarbons was determined by dissolving a defined copolymer in such hydrocarbon fluid in an amount sufficient to depress the pour point and subjecting the resulting solution to the A. S. T. M. pour test (D97-47). In some instances, this test was supplemented or replaced with shock chilling and/or maximum pour tests. Cf. Proc. A. S. T. M. 45, appendix I, p. 244 (1945). The shock chilling determination is made by observing the sample during the initial cooling step with the cooling jacket at −60° F.

The useful range for using the copolymers of this invention in hydrocarbon fluids is from a concentration of about 0.01% up to about 5%. In any case, the amount of copolymer dissolved in a hydrocarbon of waxy pour point should be sufficient to depress the normal pour point of the said hydrocarbon.

For the evaluation of the copolymers three oils were selected. One was a 150 Pennsylvania neutral having a pour point of +25° F. (oil I). This was an oil which proved to be relatively sensitive to the action of pour point depressants. The second oil (oil II) was selected to study effects in heavy oils. It was an S. A. E. 90 gear oil, compounded from 30 parts of a 180 Pennsylvania neutral and 70 parts of a 150 Pennsylvania bright stock. It had a pour point also of +25° F. A third oil (oil III) was a 500 Mid-Continent solvent-extracted neutral (S. A. E. 30) having a pour point of +25° F. This was known to be an oil which was not readily changed as to its pour point.

A copolymer from one mole each of myristyl acrylate and didodecyl fumarate was dissolved in oil I at 0.5%. The pour point of the solution was −30° F. This copolymer was also tested at concentrations in oil I of 0.25%, 0.1%, and 0.04% giving pour points of −25° F., −20° F., and 0° F., respectively. In oil II at 0.1% the depression was found to be 15° F. In oil III at 0.5% the pour point was −10° F. by the A. S. T. M. test and also by shock chilling.

A copolymer from one mole of myristyl acrylate and 0.25 moles of didodecyl fumarate was tested in all three test oils. In oil I at 0.5% to 0.1% it depressed the pour point to −20° F. At 0.04% the pour point was −5° F. In oil II at 0.1% the pour point was 0° F. In oil III the pour point by shock chilling was −15° F. at 0.5%.

A copolymer from one mole of cetyl acrylate and 0.25 mole of di-n-butyl fumarate was examined in oil I. At 0.5% the pour point was lowered 20° F.

A copolymer from one mole each of cetyl acrylate and dibutyl fumarate in all three test oils. In oil I at 0.5%, 0.25%, and 0.1% the pour points were −20° F., −15° F., and −10° F., respectively. In oil III at 0.5% the maximum pour point was −20° F.

A copolymer from one mole of cetyl acrylate and two moles of di-n-butyl fumarate was tested in oil I. At 0.5% it gave a pour point of −10° F.

A copolymer of one mole of cetyl acrylate and three moles of di-n-butyl acrylate at 0.5% in oil I gave a pour point of +25° F., thus not lowering the pour point.

A copolymer from one mole of cetyl acrylate and 0.25 mole of di-n-octyl fumarate in oil I at 0.5% and 0.25% gave pour points of −5° F. and at 0.1%, 0° F.

A copolymer from cetyl acrylate and di-n-octyl fumarate at 1:1.5 mole ratio gave a pour point of −35° F. in oil I at 0.5%, of −20° F. at 0.25%, and of −5° F. at 0.1%. In oil III at 0.5% it gave a pour point of −10° F. by shock cooling.

A copolymer from cetyl acrylate and di-n-octyl fumarate at 1:3 mole ratio gave pour points of −25° F. at 0.5% in oil I and of −10° F. at 0.25% in oil I.

A copolymer from cetyl acrylate and di-n-octyl fumarate at 1:5 mole ratio failed to depress the pour points of the test oils. For example, in oil I at 0.5% the pour point was +30° F.

A copolymer of cetyl acrylate and didodecyl fumarate at a 1:0.25 mole ratio gave pour points as follows: in oil I at 0.5% to 0.1%, −10° F.; in oil II at 0.1%, +15° F.; in oil III at 0.5%, +5° F. by shock chilling.

A copolymer from cetyl acrylate and didodecyl fumarate at a 1:1 mole ratio gave pour points as follows: in oil I at 0.5% −40° F., at 0.25% −25° F., at 0.1% −20° F., and at 0.04% −5° F.; in oil II at 0.1% +10° F.; and in oil III at 0.5% −20° F. by shock chilling.

A copolymer from cetyl acrylate and didodecyl fumarate at a 1:8 mole ratio failed to depress the pour point of the oils.

A copolymer from octadecyl acrylate and di-2-ethylhexyl maleate in a 1:3 mole ratio in oil I at 0.5% and 0.25% gave pour points of 0° F.

A copolymer from octadecyl acrylate and di(3,5,5-trimethylhexyl)maleate in a 1:2 mole ratio gave pour points as follows: in oil I at 0.5% and 0.25%, −10° F.; and in oil III at 0.5%, −10° F.

A copolymer from octadecyl acrylate and di-n-decyl maleate in a 1:2 mole ratio gave a pour point in oil I of −5° F. at 0.5% and 0° F. at 0.25%.

A copolymer from octadecyl acrylate and didodecyl maleate in a 1:1.36 mole ratio gave pour points as follows: in oil I at 0.25%, −20° F. and at 0.04%, 0° F.; in oil II at 0.1%, 0° F. and at 0.04%, +5° F.; and in oil III at 0.5%, −10° F. by shock chilling.

A copolymer from octadecyl acrylate and didodecyl chloromaleate in a 1:2 mole ratio gave pour points in oil I at 0.5% of −15° F. and at 0.25% and 0.1% of −10° F.; and in oil III at 0.5% of 0° F.

A copolymer from octadecyl acrylate and didodecyl citraconate at a mole ratio of 1:1.36 gave a pour point of 0° F. in oil III at 0.5%. The octadecyl acrylate and didodecyl mesaconate at 1:1.36 mole ratio gave the same result.

A mechanical mixture of the polymer of octadecyl acrylate and the polymer of didodecyl chloromaleate in a 1:2 mole ratio was dissolved in oil I at 0.5% of the mixture. The pour point was +30° F.

A copolymer from octadecyl acrylate and dimyristyl maleate in a 1:2 mole ratio gave pour points as follows: in oil I at 0.5%, 0° F., at 0.25%, −5° F., and at 0.1%, 0° F.

A polymer of octadecyl acrylate in oil I at 0.5% gave a pour point of +30° F. A polymer of cetyl acrylate in oil I at 0.5% also gave a pour point of +30° F.

A polymer of didecyl maleate at 0.5% in oil I gave a pour point of +30° F. A polymer of didodecyl citraconate at 0.5% in oil I gave a pour point of +30° F. A polymer of didodecyl chloromaleate gave a pour point of +30° F. in oil I at 0.5%.

A copolymer of cetyl acrylate and diisobutyl maleate at 1:1 mole ratio in oil I at 0.5% gave a pour point of +5° F.

A copolymer of cetyl acrylate and didodecyl citraconate in a 1:1.36 mole ratio gave a pour point of 0° F. in oil I at 0.5%, of 10° F. in oil II at 0.1%, and of 0° F. in oil III at 0.5%.

A copolymer of octadecyl thioacrylate and didodecyl maleate at 1:1.5 mole ratio gave pour points of −25° F., −15° F., and 0° F. in oil I at 0.5%, 0.25%, and 0.1%, respectively.

Data for the viscosity of oils containing copolymers of this invention show that as the molecular size of the copolymer increases their efficiency as additives for improving the viscosity-index also increases. A copolymer of octadecyl acrylate and didodecyl maleate in 1:1.36 mole ratio in oil I at 0.5% increased the viscosity of the oil from 5.15 centistokes at 210° F. to 5.51 centistokes at 210° F. The viscosity index was changed from 106.9 to 112.2, the viscosities at 100° F. being 30.9 centistokes for the oil itself and 33.3 centistokes for oil with 0.5% of copolymer. At 2% of copolymer the viscosity index was 126.0. The viscosity of a 30% solution of this copolymer in toluene was 125 centistokes at 100° F.

The copolymers of this invention are new. They are characterized by their solubility in hydrocarbon fluids and their capacity for imparting thereto an increase in viscosity which is coupled with some improvement in viscosity index and lowering of pour point when the pour point results from a wax content. These copolymers are useful not only in petroleum lubricating oils having waxy pour points but also in fuel oils and diesel fuels and the like. The fluid hydrocarbons upon which these copolymers act are generally from paraffinic or naphthenic stocks. These copolymers may be used in conjunction with other additives, such as antioxidants, oiliness agents, detergents, and the like.

Compositions based on the copolymers of this invention dissolved in a wax-containing hydrocarbon liquid usually contain from 0.01% to 5% of the copolymer. There are some oils which are so susceptible to the action of the copolymers that a concentration of even 0.01% or 0.02% gives a practical depression of the pour point. Some oils advantageously may be treated with 5% or even more of one of these copolymers. This is particularly true in cases in which an increase in viscosity or an improvement in viscosity index is desired along with depression of pour point. In most cases concentrations of 0.05% to 2% of a copolymer are sufficient and highly effective for lowering the pour point and are preferred.

We claim:

1. A copolymer of (A) an ester of acrylic acid and a saturated monohydric aliphatic alcohol, ROH, in which R is an alkyl group of 14 to 18 carbon atoms with a minimum carbon chain of 14 carbon atoms, and (B) an ester of a saturated monohydric aliphatic alcohol, R'OH, in which R' is an alkyl group of 4 to 14 carbon atoms, and a maleic-type acid, $HOOCC(X)=CHCOOH$, in which X is a member of the class consisting of hydrogen, chlorine and the methyl group, the proportion of (A) ester units to (B) ester units being from 1:0.25 to 1:$n$, where $n$ is one half the number of carbon atoms occurring in the longest straight chain of the group R'.

2. A copolymer of cetyl acrylate and didodecyl fumarate in a ratio between 1:0.25 and 1:6.

3. A copolymer of octadecyl acrylate and didodecyl maleate in a ratio between 1:0.25 and 1:6.

HARRY T. NEHER.
WILLIAM L. VAN HORNE.
LA VERNE N. BAUER.

REFERENCES CITED

The following references are of record in the file of this patent:

UNITED STATES PATENTS

| Number | Name | Date |
|---|---|---|
| 2,047,398 | Voss | July 14, 1936 |
| 2,129,662 | Barrett et al. | Sept. 13, 1938 |
| 2,286,251 | Arnold | June 16, 1942 |
| 2,366,517 | Gleason | Jan. 2, 1945 |
| 2,514,895 | Neher et al. | July 11, 1950 |
| 2,544,691 | Kugler et al. | Mar. 13, 1951 |
| 2,580,053 | Tutwiler et al. | Dec. 25, 1951 |